United States Patent
Wang (10) Patent No.: US 9,582,931 B2
(45) Date of Patent: Feb. 28, 2017

(54) SURFACE SMOOTHING WITHIN AN EARTH MODEL OF A GEOLOGICAL VOLUME OF INTEREST

(75) Inventor: Yue Wang, Danville, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 2111 days.

(21) Appl. No.: 12/714,241

(22) Filed: Feb. 26, 2010

(65) Prior Publication Data

US 2011/0211761 A1 Sep. 1, 2011

(51) Int. Cl.
*G06T 17/05* (2011.01)
*G06T 17/20* (2006.01)

(52) U.S. Cl.
CPC .............. *G06T 17/05* (2013.01); *G06T 17/20* (2013.01)

(58) Field of Classification Search
USPC .......................................................... 345/420
See application file for complete search history.

(56) References Cited

U.S. PATENT DOCUMENTS

| | | | |
|---|---|---|---|
| 6,438,493 B1 * | 8/2002 | West et al. ......................... | 702/2 |
| 6,560,540 B2 * | 5/2003 | West et al. ....................... | 702/14 |
| 7,203,600 B2 * | 4/2007 | Keers et al. ..................... | 702/14 |
| 7,355,923 B2 * | 4/2008 | Reshef et al. ................... | 367/53 |
| 7,480,206 B2 * | 1/2009 | Hill ................................. | 367/73 |
| 8,274,859 B2 * | 9/2012 | Maucec et al. ................. | 367/43 |
| 8,311,788 B2 * | 11/2012 | Hurley et al. .................... | 703/9 |
| 8,326,543 B2 * | 12/2012 | Nemeth et al. ................. | 702/14 |
| 2002/0051004 A1 | 5/2002 | Trika et al. | |
| 2003/0107572 A1 * | 6/2003 | Smith et al. ................... | 345/428 |
| 2005/0091016 A1 * | 4/2005 | Godavarthy et al. ............ | 703/2 |
| 2005/0264554 A1 * | 12/2005 | Deming ........................ | 345/418 |
| 2006/0028480 A1 | 2/2006 | Engel | |
| 2006/0235666 A1 * | 10/2006 | Assa et al. ...................... | 703/10 |
| 2009/0304236 A1 * | 12/2009 | Francini et al. .............. | 382/109 |
| 2010/0149917 A1 * | 6/2010 | Imhof et al. .................... | 367/53 |
| 2010/0161232 A1 * | 6/2010 | Chen et al. ..................... | 702/16 |
| 2010/0220895 A1 * | 9/2010 | Koren et al. .................. | 382/109 |
| 2011/0054857 A1 * | 3/2011 | Moguchaya ..................... | 703/2 |

OTHER PUBLICATIONS

BAI, "A Hierachical Visualization Model of the Global Terrain Based on QTM", 2008.*
Renato Pajarola, "Large Scale Terrain Visualization Using The Restricted Quatree Triangulation", 1998.*

* cited by examiner

*Primary Examiner* — Michelle Chin
(74) *Attorney, Agent, or Firm* — Dan Krueger; Marie L. Clapp (57) ABSTRACT

Surfaces may be smoothed within an earth model of a geological volume of interest. More specifically, smoothing may be done on a specific surface by smoothing or otherwise altering dip values without changing the position of the surface within the earth model. Dip values may determine certain behaviors of a surface such as reflection and refraction of seismic energy propagating within the earth model.

15 Claims, 8 Drawing Sheets

SURFACE SMOOTHING WITHIN AN EARTH MODEL OF A GEOLOGICAL VOLUME OF INTEREST

FIELD OF THE INVENTION

The invention relates to surface smoothing within an earth model of a geological volume of interest.

BACKGROUND OF THE INVENTION

An earth model of a geological volume of interest represents one or more characteristics of that volume of interest such as spatial structure and compositional properties. Various compositions can include different types of rocks, which can display differing seismic wave propagation velocities. Adjacent geological bodies (e.g., layers) having significant velocity differences can form interfaces known as geological surfaces or horizons. Such surfaces can have very complex shapes, and can result, for example, in reflection and refraction of propagating seismic energy that impinges those surfaces.

For seismic imaging and modeling such as that which includes high-frequency ray approximation, large velocity contrast and complex geological surfaces can make ray energy diffract or turn in an incoherent manner. This can introduce incoherent stacking in an imaging step. Traditionally, processing is applied on a velocity field to reduce velocity contrast at a surface. The smoothness of a surface can be difficult to control. One conventional approach for surface smoothing includes smoothing positional values (e.g., depth values) of a given surface. Since spatial location of a surface changes with this approach, undesired distortions in travel time, phase, and amplitudes can be introduced.

SUMMARY OF THE INVENTION

One aspect of the invention relates to a system configured to process an earth model of a geological volume of interest. The system may include one or more processors configured to execute computer program modules. Such computer program modules may include an earth model module, a dip module, and a smoothing module. The earth model module may be configured to obtain an earth model of the geological volume of interest. The earth model may include a polygon mesh that describes the position of a surface within the geological volume of interest. The polygon mesh may include planar polygons defined by three or more vertices. The earth model may include positional coordinates for the vertices of the polygons. The dip module may be configured to determine values of the dip of the polygon mesh within the earth model. Dip is orientation with respect to a reference direction. In one embodiment, the dip module is configured to determine values of the dip of the polygon mesh by determining values of dip for the individual polygons based on the positional coordinates of the vertices defining the polygons. The smoothing module may be configured to smooth the values of dip along the polygon mesh without impacting the positional coordinates for the vertices of the polygons.

Another aspect of the invention relates to a computer-implemented method of processing an earth model of a geological volume of interest. The method may include obtaining an earth model of the geological volume of interest. The earth model may include a polygon mesh that describes the position of a surface within the geological volume of interest. The polygon mesh include of planar polygons defined by three or more vertices. The earth model may include positional coordinates for the vertices of the polygons. The method also may include determining values of the dip of the polygon mesh within the earth model. Determining values of the dip of the polygon mesh may include determining values of dip for the individual polygons based on the positional coordinates of the vertices defining the polygons. The method may further include smoothing the values of dip for the individual polygons without impacting the positional coordinates for the vertices of the polygons.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

The present invention may be described and implemented in the general context of a system and computer methods to be executed by a computer. Such computer-executable instructions may include programs, routines, objects, components, data structures, and computer software technologies that can be used to perform particular tasks and process abstract data types. Software implementations of the present invention may be coded in different languages for application in a variety of computing platforms and environments. It will be appreciated that the scope and underlying principles of the present invention are not limited to any particular computer software technology.

Moreover, those skilled in the art will appreciate that the present invention may be practiced using any one or combination of hardware and software configurations, including but not limited to a system having single and/or multi-processor computer processors system, hand-held devices, programmable consumer electronics, mini-computers, mainframe computers, and the like. The invention may also be practiced in distributed computing environments where tasks are performed by servers or other processing devices that are linked through one or more data communications networks. In a distributed computing environment, program modules may be located in both local and remote computer storage media including memory storage devices.

Also, an article of manufacture for use with a computer processor, such as a CD, pre-recorded disk or other equivalent devices, may include a computer program storage medium and program means recorded thereon for directing the computer processor to facilitate the implementation and practice of the present invention. Such devices and articles of manufacture also fall within the spirit and scope of the present invention.

Referring now to the drawings, embodiments of the present invention will be described. The invention can be implemented in numerous ways, including for example as a system (including a computer processing system), a method (including a computer implemented method), an apparatus, a computer readable medium, a computer program product, a graphical user interface, a web portal, or a data structure tangibly fixed in a computer readable memory. Several embodiments of the present invention are discussed below. The appended drawings illustrate only typical embodiments of the present invention and therefore are not to be considered limiting of its scope and breadth.

Figure 1:
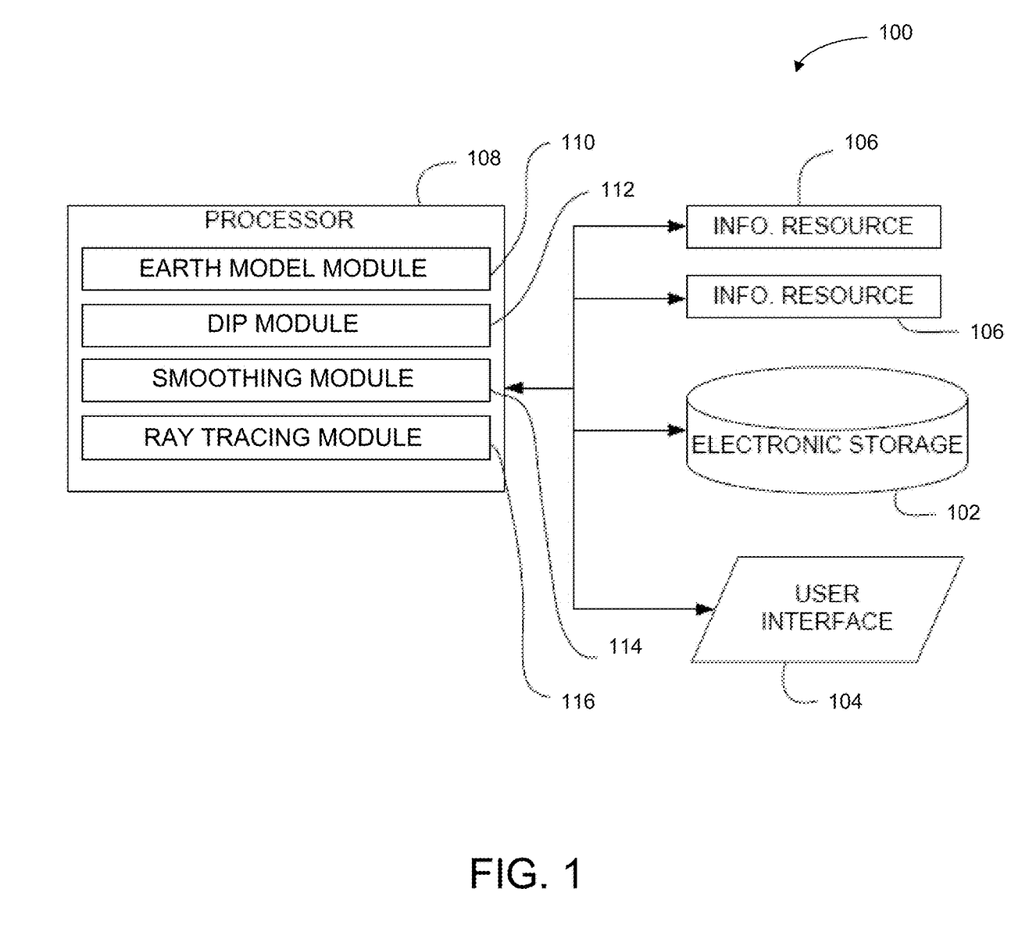
FIG. 1 illustrates a system configured to generate and/or manipulate an earth model of a geological volume of interest, in accordance with one or more embodiments of the invention.

FIG. 1 illustrates a system 100 configured to generate and/or manipulate an earth model of a geological volume of interest, in accordance with one or more embodiments of the invention. In generating and/or manipulating an earth model, the system 100 smoothes surfaces within the earth models in order to, for example, increase ray tracing and imaging coherency. More specifically, smoothing may be done on a specific surface by smoothing or otherwise altering dip values without changing the position of the surface within the earth model. Dip values can be a vector that determines certain behaviors of a surface such as reflection and refraction of seismic energy propagating in the earth model. Conventionally, dip values are decided by the surface normal direction at a given location on a surface. In one embodiment, system 100 includes electronic storage 102, a user interface 104, one or more information resources 106, one or more processors 108, and/or other components.

In one embodiment, electronic storage 102 includes electronic storage media that electronically stores information. The electronic storage media of electronic storage 102 may include system storage that is provided integrally (i.e., substantially non-removable) with system 100 and/or removable storage that is removably connectable to system 100 via, for example, a port (e.g., a USB port, a firewire port, etc.) or a drive (e.g., a disk drive, etc.). Electronic storage 102 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 102 may store software algorithms, information determined by processor 108, information received via user interface 104, information received from information resources 106, and/or other information that enables system 100 to function properly. Electronic storage 102 may be a separate component within system 100, or electronic storage 102 may be provided integrally with one or more other components of system 100 (e.g., processor 108).

User interface 104 is configured to provide an interface between system 100 and a user through which the user may provide information to and receive information from system 100. This enables data, results, and/or instructions and any other communicable items, collectively referred to as "information," to be communicated between the user and the system 100. As used herein, the term "user" may refer to a single individual or a group of individuals who may be working in coordination. Examples of interface devices suitable for inclusion in user interface 104 include a keypad, buttons, switches, a keyboard, knobs, levers, a display screen, a touch screen, speakers, a microphone, an indicator light, an audible alarm, and a printer. In one embodiment, user interface 104 actually includes a plurality of separate interfaces.

It is to be understood that other communication techniques, either hard-wired or wireless, are also contemplated by the present invention as user interface 104. For example, the present invention contemplates that user interface 104 may be integrated with a removable storage interface provided by electronic storage 102. In this example, information may be loaded into system 100 from removable storage (e.g., a smart card, a flash drive, a removable disk, etc.) that enables the user(s) to customize the implementation of system 100. Other exemplary input devices and techniques adapted for use with system 100 as user interface 104 include, but are not limited to, an RS-232 port, RF link, an IR link, modem (telephone, cable or other). In short, any technique for communicating information with system 100 is contemplated by the present invention as user interface 104.

The information resources 106 include one or more sources of information related to the geological volume of interest and/or the process of generating an earth model of the geological volume of interest. By way of non-limiting example, one of information resources 106 may include seismic data acquired at or near the geological volume of interest, information derived therefrom, and/or information related to the acquisition. The seismic data may include individual traces of seismic data, or the data recorded at on one channel of seismic energy propagating through the geological volume of interest from a source. The information derived from the seismic data may include, for example, a velocity model, beam properties associated with beams used to model the propagation of seismic energy through the geological volume of interest, Green's functions associated with beams used to model the propagation of seismic energy through the geological volume of interest, and/or other information. Information related to the acquisition of seismic data may include, for example, data related to the position and/or orientation of a source of seismic energy, the positions and/or orientations of one or more detectors of seismic energy, the time at which energy was generated by the source and directed into the geological volume of interest, and/or other information.

Processor 108 is configured to provide information processing capabilities in system 100. As such, processor 108 may include one or more of a digital processor, an analog processor, a digital circuit designed to process information, an analog circuit designed to process information, a state machine, and/or other mechanisms for electronically processing information. Although processor 108 is shown in FIG. 1 as a single entity, this is for illustrative purposes only. In some implementations, processor 108 may include a plurality of processing units. These processing units may be physically located within the same device or computing platform, or processor 108 may represent processing functionality of a plurality of devices operating in coordination.

As is shown in FIG. 1, processor 108 may be configured to execute one or more computer program modules. The one or more computer program modules may include one or more of an earth model module 110, a dip module 112, a smoothing module 114, a ray tracing module 116, and/or other modules. Processor 108 may be configured to execute modules 110, 112, 114, and/or 116 by software; hardware; firmware; some combination of software, hardware, and/or firmware; and/or other mechanisms for configuring processing capabilities on processor 108.

It should be appreciated that although modules 110, 112, 114, and 116 are illustrated in FIG. 1 as being co-located within a single processing unit, in implementations in which processor 108 includes multiple processing units, one or more of modules 110, 112, 114, and/or 116 may be located remotely from the other modules. The description of the functionality provided by the different modules 110, 112, 114, and/or 116 described below is for illustrative purposes, and is not intended to be limiting, as any of modules 110, 112, 114, and/or 116 may provide more or less functionality than is described. For example, one or more of modules 110, 112, 114, and/or 116 may be eliminated, and some or all of its functionality may be provided by other ones of modules 110, 112, 114, and/or 116. As another example, processor 108 may be configured to execute one or more additional modules that may perform some or all of the functionality attributed below to one of modules 110, 112, 114, and/or 116.

The earth model module 110 may be configured to obtain an earth model of a geological volume of interest. As mentioned herein, an earth model of a geological volume of interest can represent various characteristics of that volume of interest such as spatial structure, compositional properties, and/or other properties. The earth model may describe boundaries between regions having different compositions and/or regions displaying different velocities of seismic energy propagation. Such boundaries may be described by polygon meshes, which are discussed in further detail herein, such as in connection with FIG. 3.

Figure 2:
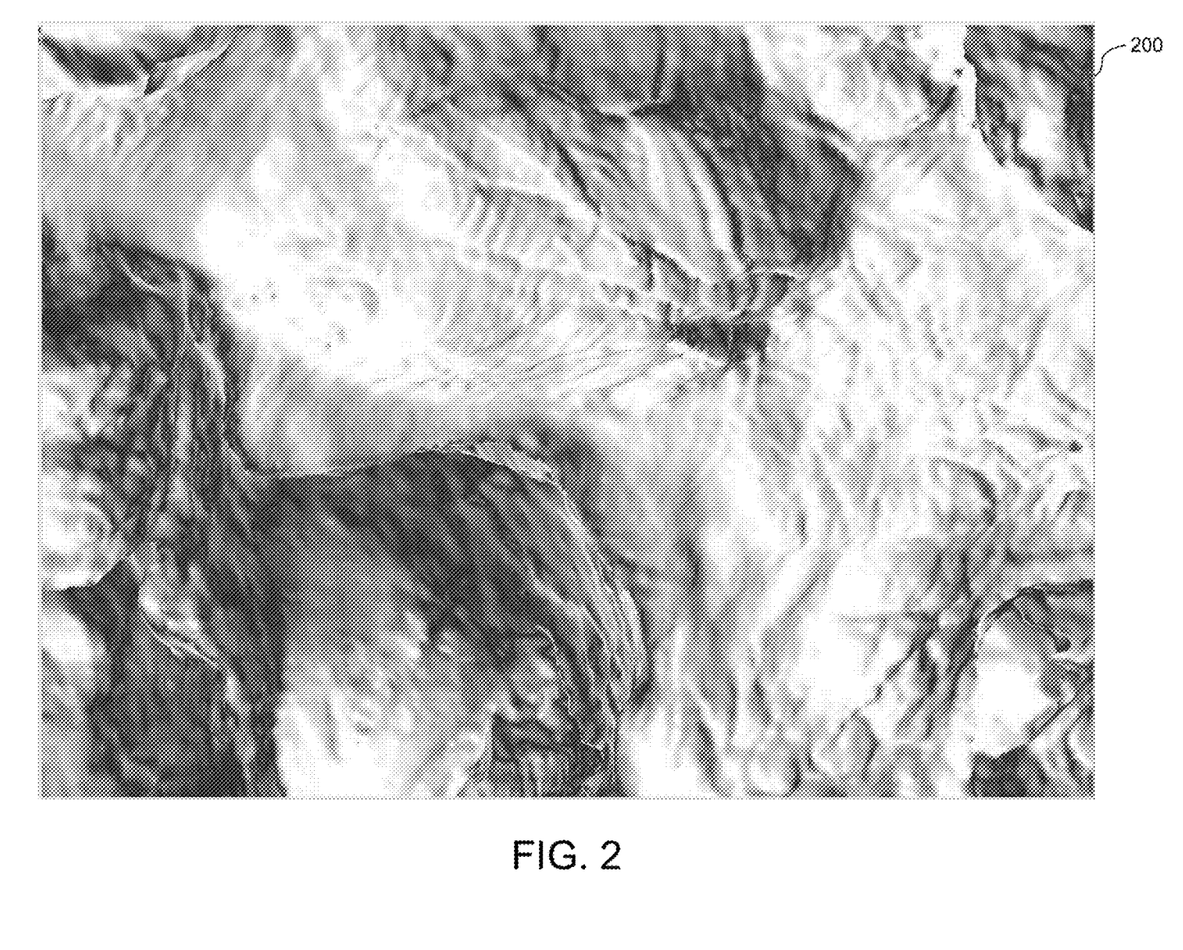
FIG. 2 illustrates an exemplary geological surface within a geological volume of interest.

FIG. 2 illustrates an exemplary geological surface 200 within a geological volume of interest. The geological surface 200 contains positional information of a plurality of points that lie on the geological surface 200. For illustrative purposes, the geological surface 200, as shown, is rendered with shaded relief to reveal surface topography. The geological surface 200, however, may be visually rendered in any manner, or not at all.

Figure 3:
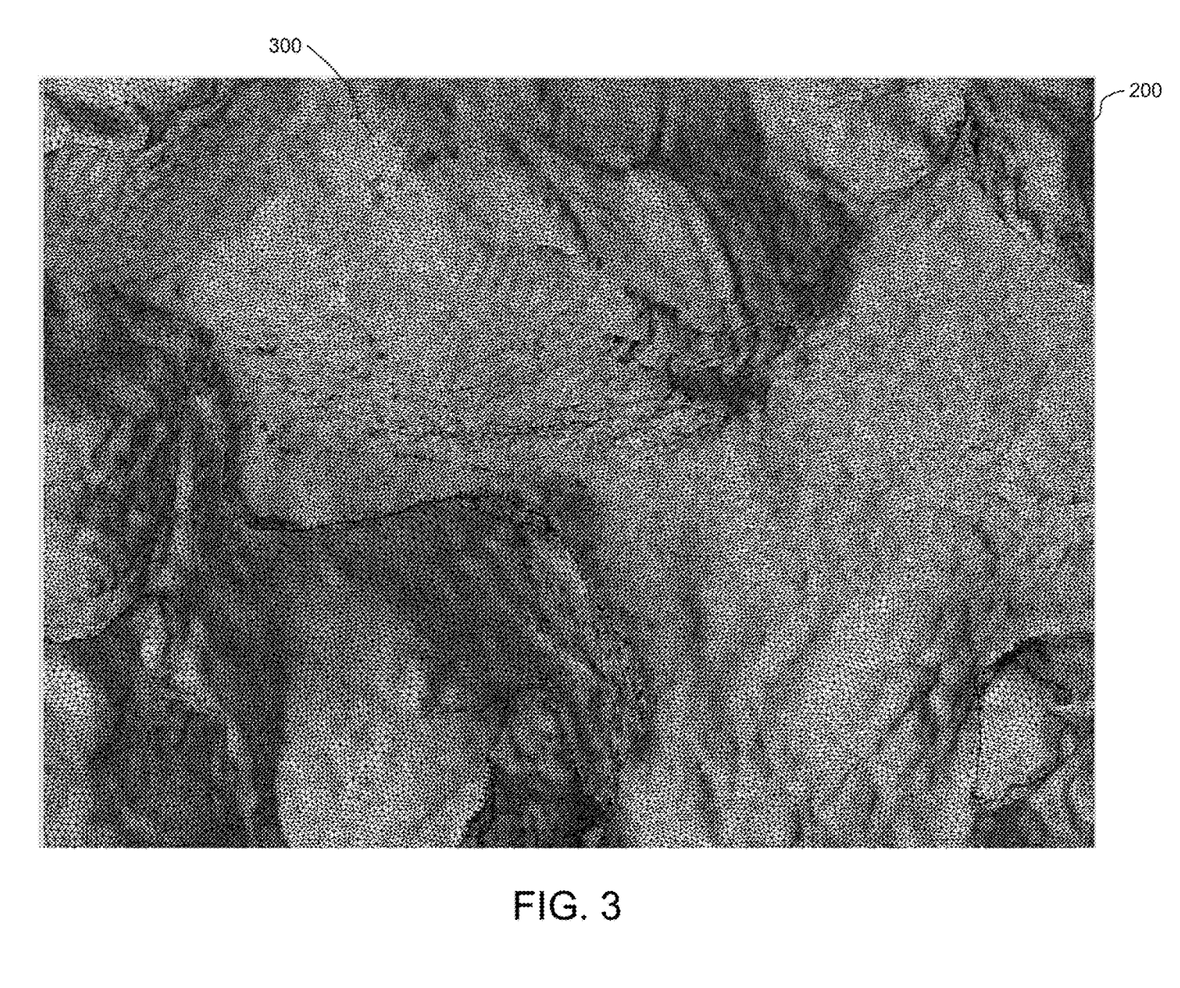
FIG. 3 illustrates the geological surface of FIG. 2 with an exemplary polygon mesh overlaid thereon.

FIG. 3 illustrates the geological surface 200 of FIG. 2 with an exemplary polygon mesh 300 overlaid thereon. Generally speaking, a polygon mesh (also known as an unstructured grid) is a collection of vertices, edges, and faces that defines a surface of a three-dimensional object, such as a volume or a structured surface. The faces typically include convex polygons defined by three or more vertices (e.g., triangles and/or quadrilaterals), concave polygons, and/or polygons with holes. A earth model may include positional coordinates for vertices of polygons in a polygon mesh that define various features such as geological surfaces. A polygon mesh may provide for rendering simplification, for dataset reduction, and/or aid in ray tracing.

The mesh 300 is depicted as a triangulated mesh, but may include any type of mesh or combinations thereof, in accordance with various embodiments. The polygon mesh 300 may be represented in a variety of ways, using different methods to store vertex, edge, and face data, including as a face-vertex mesh, a winged-edge mesh, a half-edge mesh, a quad-edge mesh, a corner-table, and/or a vertex-vertex mesh.

Figure 4:
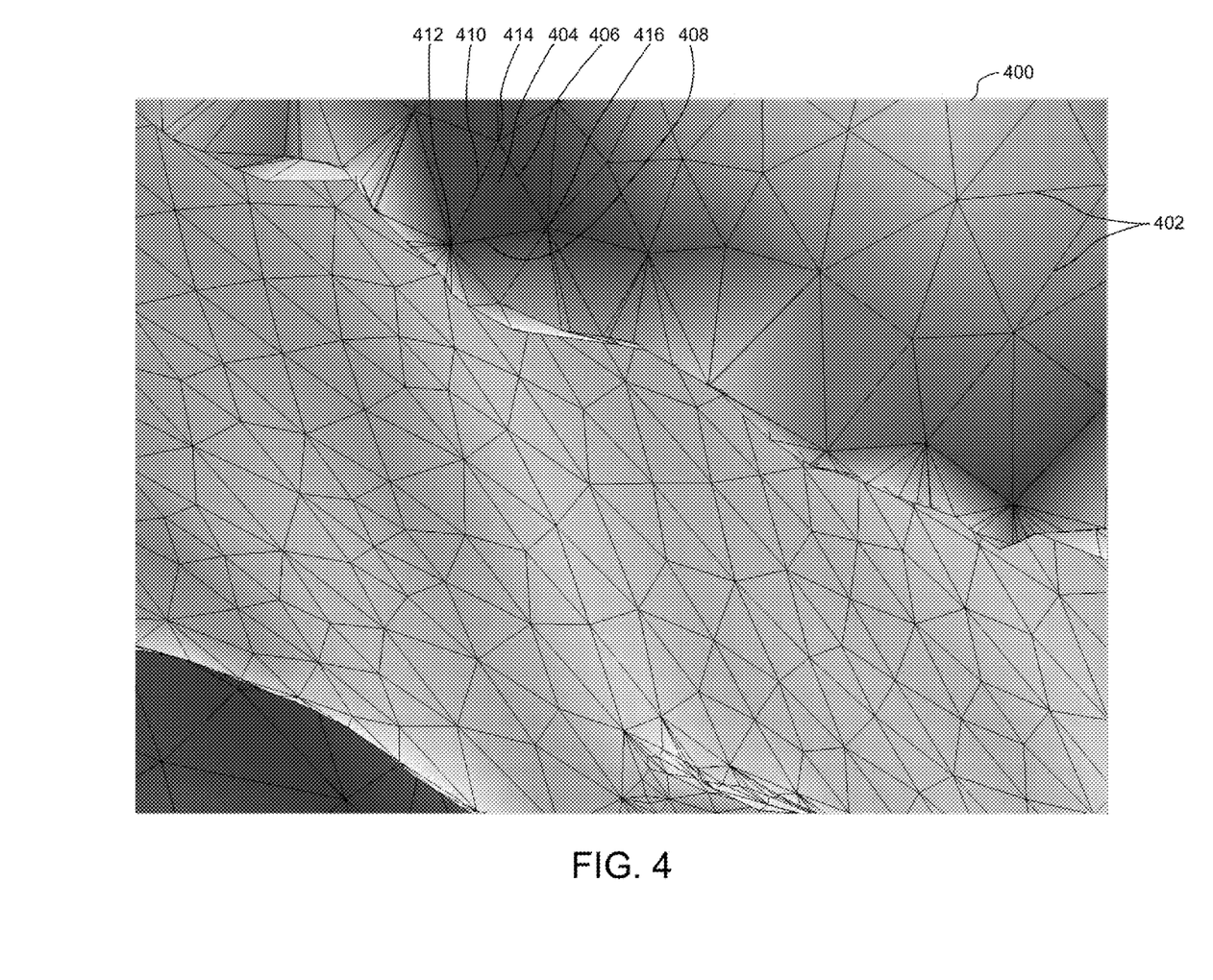
FIG. 4 illustrates a detailed view of an exemplary geological surface with an overlaid polygon mesh.

FIG. 4 illustrates a detailed view of an exemplary geological surface 400 with an overlaid polygon mesh 402. The polygon mesh 402 includes a number of abutted polygons, each including a face, three or more edges, and three or more vertices. For example, the polygon having face 404 includes edges 406, 408, and 410, which meet at vertices 412, 414, and 416. Each vertex (e.g., vertices 412, 414, and 416) is associated with positional information such as coordinates in a three-dimensional space.

Returning to FIG. 1, the dip module 112 may be configured to determine values of the dip of the polygon mesh (e.g., polygon meshes 300 and 402) within the earth model provided by the earth model module 110. Dip is orientation with respect to a reference direction. For example, dip may be described generally as the derivative of a surface spatial function that defines a geological surface. Determining values of dip of the polygon mesh within the earth model may include determining values of dip for the individual polygons based on the positional coordinates of the vertices defining the polygons. Dip values may determine various behaviors of the polygon mesh such as, for example, reflection and refraction during ray tracing.

The dip module 112 may be configured to determine values of vertex dip at individual vertices of the polygon mesh. According to exemplary embodiments, vertex dip for a given vertex is a function (e.g., average, weighted average, etc.) of dip over the polygons defined in part by the given vertex. For example, consider the mesh section 500 illustrated in FIG. 5. The mesh section 500 includes seven polygons (502, 504, 506, 508, 510, 512, and 514). The polygons 502-514 are defined by vertices 516, 518, 520, 522, 524, 526, 528, and 530. The dip of vertex 530 may be defined as the average of the dips associated with the polygons 502-514. Generally, however, dip may be computed in a number of different manners. Exemplary computations for dip are described further herein, such as in connection with the smoothing module 114 and with FIGS. 6 and 7.

The smoothing module 114 may be configured to alter (e.g., smooth) the values of dip along the polygon mesh without impacting the positional coordinates for the vertices of the polygons. Altering dip values without altering positional coordinates for the vertices of the polygons—and, by extension, without altering the position of the polygon mesh itself—can change local reflection and refractions behaviors of the polygon mesh during ray tracing, while preserving travel time, phase, and/or amplitudes during ray tracing.

Figure 5:
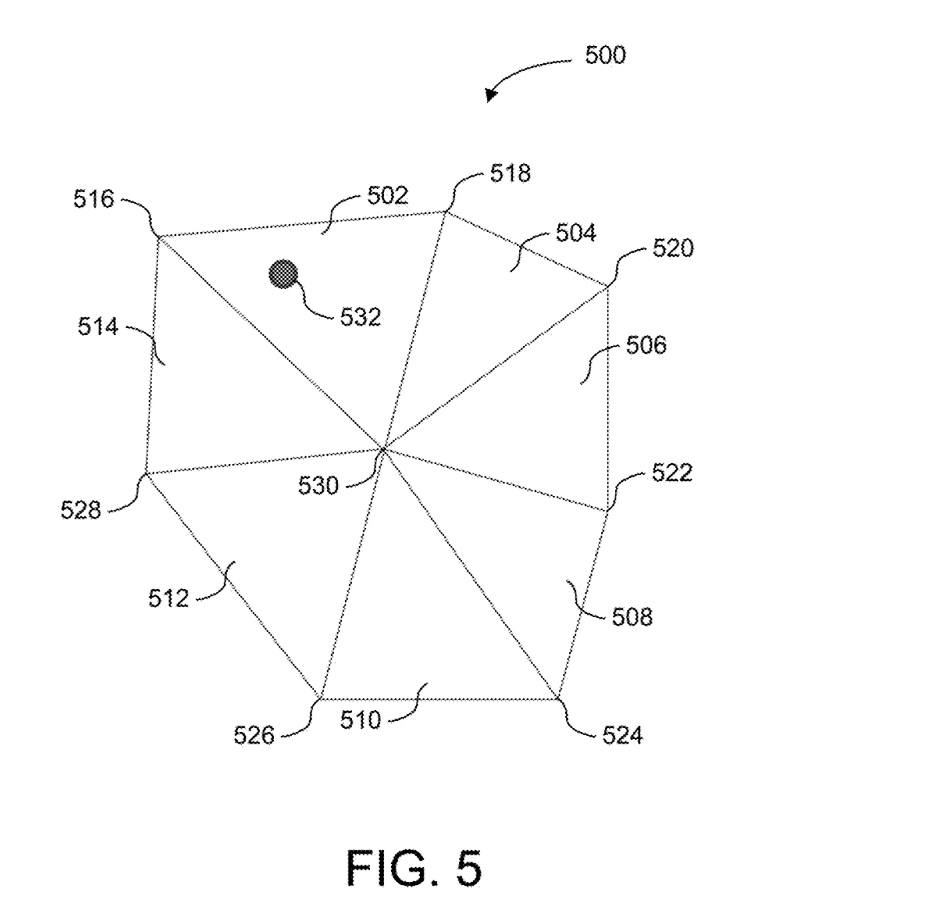
FIG. 5 illustrates an exemplary mesh section.

According to exemplary embodiments, the smoothing module 114 may be configured to determine a smoothed value of dip for a location on a given polygon within the polygon mesh as a function (e.g., average, weighted average, etc.) of the values of vertex dip for the vertices that define the given polygon. To illustrate, referring again to the mesh section 500 depicted in FIG. 5, a smoothed value of dip for point 532 within the polygon 502 may be computed as an average of the dip values associated with vertices 516, 518, and 530. According to some embodiments, a smoothed value of dip for point 532 within the polygon 502 may be computed as a weighted average of the dip values associated with vertices 516, 518, and 530. The weights applied to the values of vertex dip used to compute the weighted average may be determined based on the location of the point 532 on the polygon 502. In some embodiments, such a weighted average generally may be described as $$\bar{n} = \frac{\sum_{i=1}^{N} w_i x_i}{\sum_{i=1}^{N} w_i},$$ (Equation 1)

where $\bar{n}$ is the weighted average dip value at a point of interest, $x_i$ is the dip of a given vertex defining a polygon that contains the point of interest, $w_i$ is the distance between the given vertex and the point of interest, and N is the total number of vertices that define the polygon that contains point. It is noteworthy that any type of interpolation (e.g., linear or non-linear) may be utilized in computing a dip value for a point of interest.

The smoothing module 114 may be configured to further smooth the smoothed values of dip. For example, the smoothing module 114 may determine smoothed values of vertex dip and then determine further smoothed values of dip. The smoothed value of vertex dip for a given vertex may be determined as an average of the smoothed values of dip at the polygons defined in part by the given vertex, while the further smoothed value of dip at a given polygon may be determined based on an average of smoothed vertex dip at the vertices that define the given polygon.

The smoothing module 114 may be configured to smooth the values of dip of the individual polygons in iterative smoothing passes through the polygons. Each iterative smoothing pass through the polygons may incrementally increase the uniformity of dip across the polygon mesh. According to exemplary embodiments, the number of iterative smoothing passes made through the polygons may be dictated by user input to the system, such as via user interface 104.

The ray tracing module 116 may be configured to trace rays through the earth model provided by the earth model module 110. Generally speaking, ray tracing can be used to calculate or model a path of seismic energy propagating through a geological volume of interest represented by the earth model. Since the earth model may represent regions of varying propagation velocity, absorption characteristics, reflecting/refracting surfaces, and/or the like, the seismic energy propagating in the earth model may bend, change direction, reflect, and/or refract. The ray-tracing module 116 may use the positional coordinates for the vertices of the polygons and the smoothed values of dip along the polygon mesh in determining various characteristics of rays within the earth model. For example, the ray tracing module 116 may determine the refraction of rays caused by the surface within the earth model. The ray tracing module 116 may determine the reflection of rays caused by the surface within the earth model.

Figure 6A:
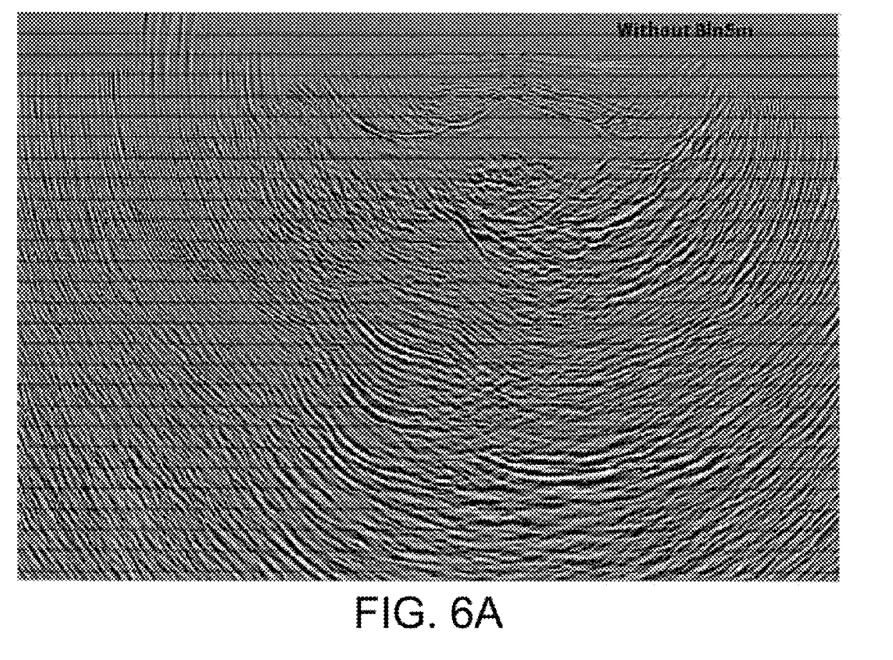
FIGS. 6A and 6B respectively illustrate a seismic energy field without and with dip smoothing, according to exemplary embodiments.
Figure 6B:
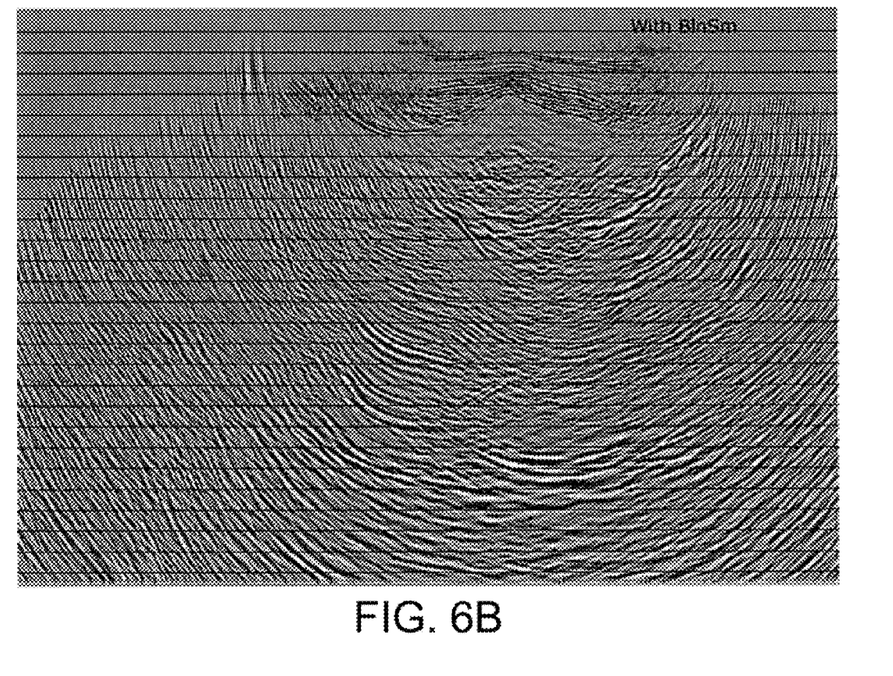

Smoothing dips, rather than smoothing positional coordinates (i.e., spatial smoothing or depth smoothing), associated with a surface in an earth model may overcome or greatly diminish many issues common in conventional earth model processing. Spatial smoothing can change the position of the surface and, therefore, travel time of seismic energy propagating to and from that surface. Moreover, spatial smoothing does not guarantee smoothness of dips. An appropriate degree of spatial smoothing such as for migration algorithms may be difficult to gauge for a user interpreting or building an earth model. With dip smoothing, optimal smoothing may be determined using migration tests, structures such as surfaces are not altered, wave turn can be reconstructed more coherently, and image quality may be improved due to more coherent rays. FIGS. 6A and 6B respectively illustrate a seismic energy field without and with dip smoothing, according to exemplary embodiments.

Figure 7:
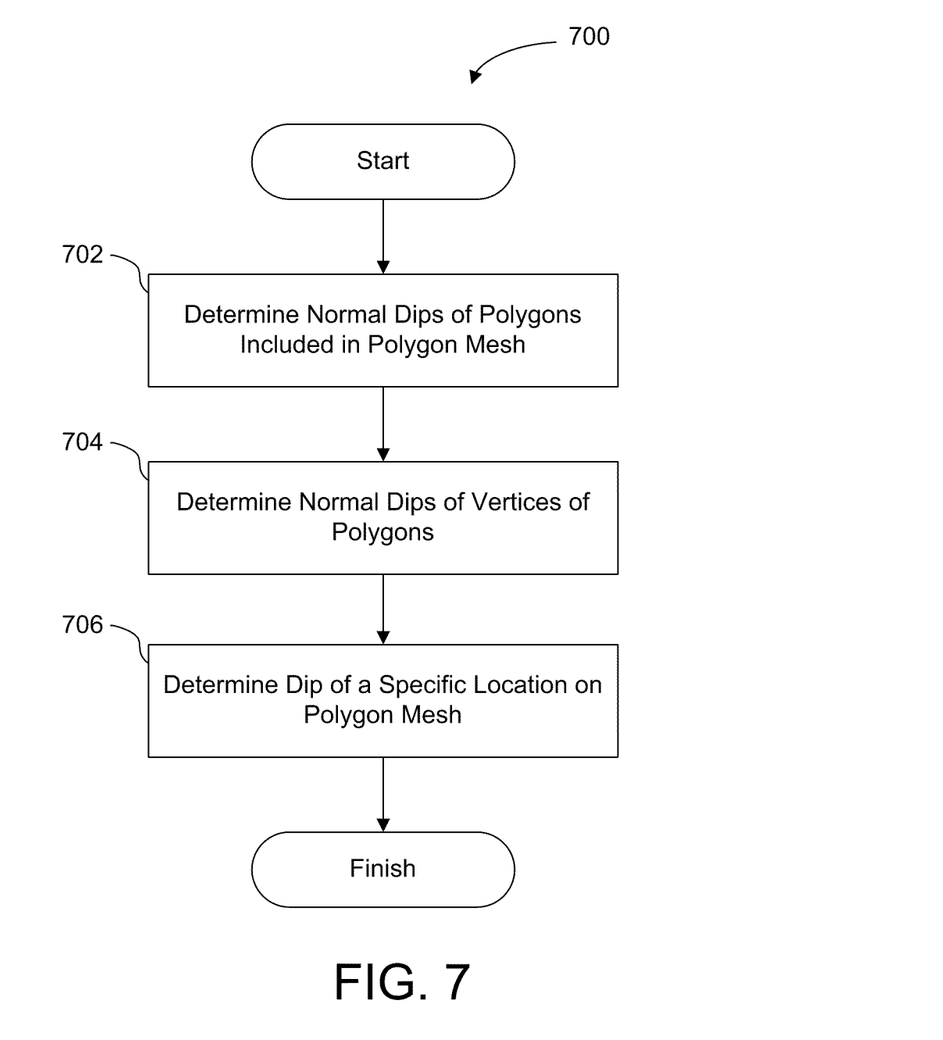
FIG. 7 illustrates a method for processing an earth model of a geological volume of interest, in accordance with one or more embodiments of the invention.

FIG. 7 illustrates a method 700 for processing an earth model of a geological volume of interest, in accordance with one or more embodiments of the invention. The operations of the method 700 presented below are intended to be illustrative. In some embodiments, the method 700 may be accomplished with one or more additional operations not described, and/or without one or more of the operations discussed. Additionally, the order in which the operations of the method 700 are illustrated in FIG. 7 and described below is not intended to be limiting. Moreover, the mesh section 500 of FIG. 5 is referred to in describing the method 700, however it is understood that the method 700 may be applied to any earth model, polygon mesh, or section thereof.

In some embodiments, the method 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of the method 700 in response to instructions stored electronically on an electronic storage medium. The one or more processing devices may include one or more devices configured through hardware, firmware, and/or software to be specifically designed for execution of one or more of the operations of the method 700.

At an operation 702, normal dips of polygons included in a polygon mesh are determined. A normal dip can be expressed in vector form as $(n_x, n_y, n_z)$, in accordance with exemplary embodiments. Referring to the mesh section 500 of FIG. 5, for example, a normal dip for one or more of the polygons 502-514 is determined, according to operation 702. In some embodiments, operation 702 may be performed by a dip module that is the same as or similar to the dip module 112 described in connection with FIG. 1.

At an operation 704, normal dips of vertices of the polygons are determined. In exemplary embodiments, the normal dip of a given vertex may have a value computed from an average of the normal dip values of polygons that share that given vertex. For example, in reference to the mesh section 500 of FIG. 5, the normal dip of the vertex 530 may be calculated as the average of the normal dips of polygons 502-514. Generally, this can be expressed as $$n_{vert} = \left( \frac{\sum_{i=1}^{N} (n_x)_i}{N}, \frac{\sum_{i=1}^{N} (n_y)_i}{N}, \frac{\sum_{i=1}^{N} (n_z)_i}{N} \right),$$ (Equation 2)

where $n_{vert}$ is the normal dip of a vertex; $n_x$, $n_y$, and $n_z$ represent, respectively, x-, y-, and z-components of normal dips of each of the polygons that share the vertex; and N is the total number of polygons that share the vertex. According to some embodiments, operation 702 may be performed by a dip module that is the same as or similar to the dip module 112 described in connection with FIG. 1.

At an operation 706, dip for a specific location on the polygon mesh is determined. In some embodiments, dip of specific locations may be computed by linear interpolation of proximal vertex normal dips. Referring to the mesh section 500 of FIG. 5, for example, the dip of the point 532 may be computed using the normal dip values of vertices 516, 518, and 530. Additionally, the areas of sub-triangles constructed by the point 532 and the vertices 516, 518, and 530 (indicated with dashed lines) may be used to compute the dip of the point 532, in accordance with some embodiments. Operation 704 may be performed by a smoothing module that is the same as or similar to the smoothing module 114 described in connection with FIG. 1, in accordance with some embodiments.

Figure 8:
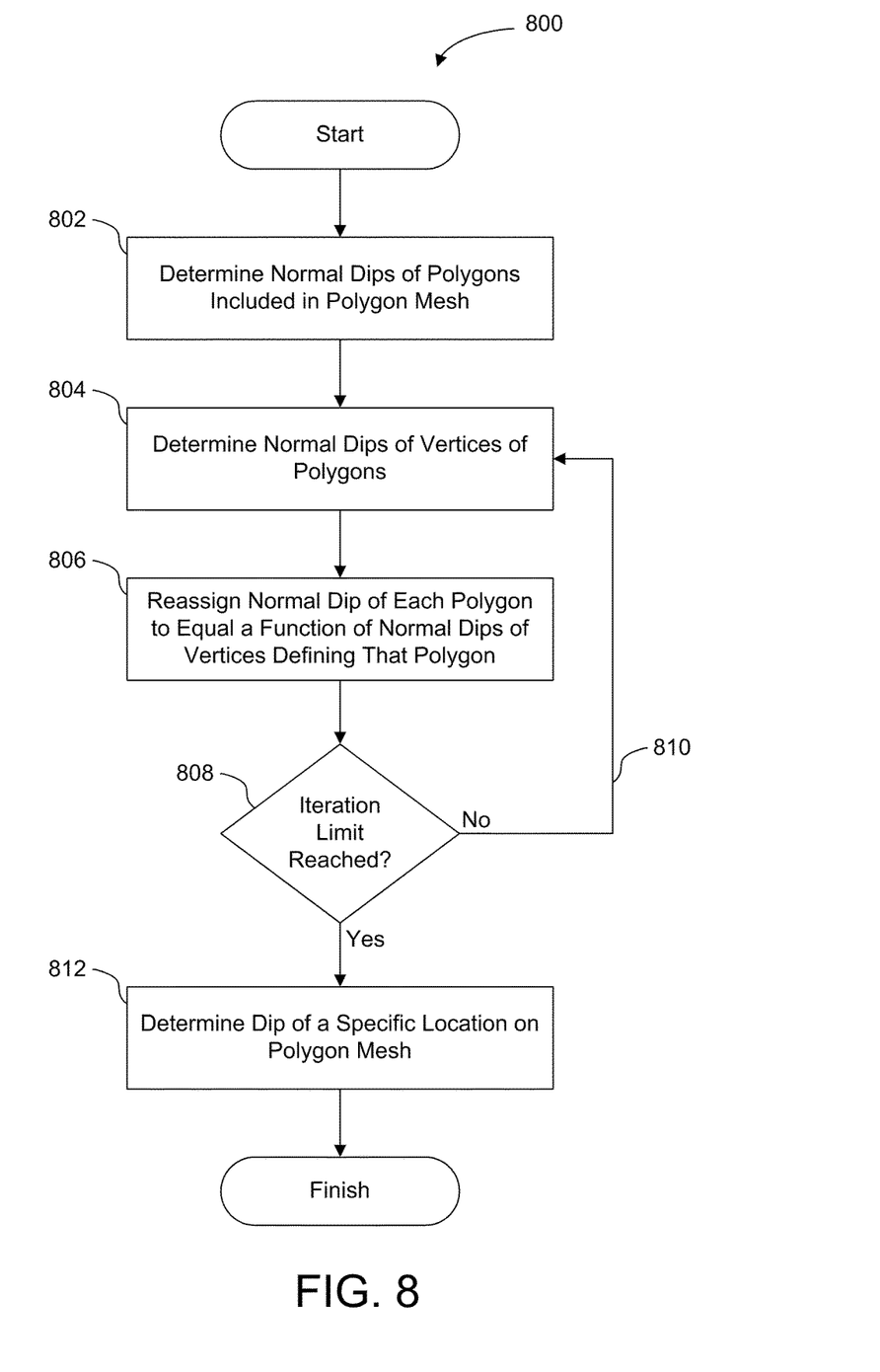
FIG. 8 illustrates a method for processing an earth model of a geological volume of interest, in accordance with one or more embodiments of the invention.

FIG. 8 illustrates a method 800 for processing an earth model of a geological volume of interest, in accordance with one or more embodiments of the invention. The operations of the method 800 presented below are intended to be illustrative. In some embodiments, the method 800 may be accomplished with one or more additional operations not described, and/or without one or more of the operations discussed. Additionally, the order in which the operations of the method 800 are illustrated in FIG. 8 and described below is not intended to be limiting. Moreover, the mesh section 500 of FIG. 5 is referred to in describing the method 800, however it is understood that the method 800 may be applied to any earth model, polygon mesh, or section thereof.

In some embodiments, the method 800 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of the method 800 in response to instructions stored electronically on an electronic storage medium. The one or more processing devices may include one or more devices configured through hardware, firmware, and/or software to be specifically designed for execution of one or more of the operations of the method 800.

At an operation 802, normal dips of polygons included in a polygon mesh are determined. A normal dip can be expressed in vector form as $(n_x, n_y, n_z)$, in accordance with exemplary embodiments. Referring to the mesh section 500 of FIG. 5, for example, a normal dip for one or more of the polygons 502-514 is determined, according to operation 802. In some embodiments, operation 802 may be performed by a dip module that is the same as or similar to the dip module 112 described in connection with FIG. 1.

At an operation 804, normal dips of vertices of the polygons are determined. In exemplary embodiments, the normal dip of a given vertex may have a value computed from an average of the normal dip values of polygons that share that given vertex. For example, in reference to the mesh section 500 of FIG. 5, the normal dip of the vertex 530 may be calculated as the average of the normal dips of polygons 502-514. Generally, this can be expressed as by Equation 2, presented above. According to some embodiments, operation 802 may be performed by a dip module that is the same as or similar to the dip module 112 described in connection with FIG. 1.

At an operation 806, the normal dip of each polygon is reassigned to equal a function (e.g., average) of the normal dips calculated in operation 804 of the three or more vertices that define that polygon. Referring again to the mesh section 500 of FIG. 5, for example, the normal dip of polygon 502 may be reassigned to equal the average of the normal dip values of vertices 516, 518, and 530 determined in operation 804. Operation 806 may be performed by a smoothing module that is the same as or similar to the smoothing module 114 described in connection with FIG. 1, in accordance with some embodiments.

At a decision 808, it is determined whether an iteration limit has been reached. Such an iteration limit may be a default value, predefined, user defined, based on specified resolution parameters, determined by computational capabilities of the system 100, and/or by any other indication of the iteration limit. When the iteration limit has not been reached, loop 810 returns the operation flow to the operation 804. When the iteration limit has been reached, the operation flow continues to an operation 812. In some embodiments, decision 808 may be performed by a smoothing module that is the same as or similar to the smoothing module 114 described in connection with FIG. 1.

At the operation 812, dip for a specific location on the polygon mesh is determined. In some embodiments, dip of specific locations may be computed by linear interpolation of proximal vertex normal dips. Referring to the mesh section 500 of FIG. 5, for example, the dip of the point 532 may be computed using the normal dip values of vertices 516, 518, and 530. Additionally, the areas of sub-triangles constructed by the point 532 and the vertices 516, 518, and 530 (indicated with dashed lines) may be used to compute the dip of the point 532, in accordance with some embodiments. Operation 812 may be performed by a smoothing module that is the same as or similar to the smoothing module 114 described in connection with FIG. 1, in accordance with some embodiments.

The method 700 and/or the method 800 may optionally include a ray tracing operation. In such an operation, rays may be traced through an earth model, such as that provided by the earth model module 110. Positional coordinates for vertices of a polygon mesh and smoothed dip values may be used in determining various characteristics of rays (e.g., reflection and/or refraction) within the earth model. According to some embodiments, the ray tracing operation may be performed by a ray tracing module that is the same as or similar to the ray tracing module 116 described in connection with FIG. 1.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system for processing an earth model of a geological volume of interest, the system comprising:
   one or more processors configured to execute computer program modules, the computer program modules comprising:
   an earth model module for obtaining the earth model of the geological volume of interest, wherein the earth model includes a polygon mesh that describes a position of a surface within the geological volume of interest, the polygon mesh being comprised of planar polygons defined by three or more vertices, and the earth model including positional coordinates for the vertices of the polygons;

a dip module for determining values of the dip of the polygon mesh within the earth model, wherein determining values of the dip of the polygon mesh includes determining values of dip for the individual polygons based on the positional coordinates of the vertices defining the polygons;

a smoothing module configured to smooth the values of dip along the polygon mesh without impacting the positional coordinates for the vertices of the polygons.

2. The system of claim 1, wherein the computer program modules further comprise a ray-tracing module configured to trace rays through the earth model, wherein the raytracing module uses the positional coordinates for the vertices of the polygons and the smoothed values of dip along the polygon mesh in determining one or more of (a) a refraction of rays caused by the surface or (b) a reflection of rays caused by the surface.

3. The system of claim 1, wherein the dip module is configured to determine values of vertex dip at individual vertices of the polygon mesh, wherein vertex dip for a given vertex is an average value of dip over the polygons defined in part by the given vertex.

4. The system of claim 3, wherein the smoothing module is configured to determine a smoothed value of dip for a location on a given polygon within the polygon mesh as an average of the values of vertex dip for the vertices that define the given polygon.

5. The system of claim 4, wherein the average of the values of vertex dip used to determine the smoothed value of dip for the given polygon is a weighted average, and wherein weights applied to the values of vertex dip used to compute the weighted average are determined based on the location on the given polygon for which the smoothed value of dip is being determined.

6. The system of claim 4, wherein the smoothing module is further configured to further smooth the smoothed values of dip by:
 determining smoothed values of vertex dip, wherein the smoothed value of vertex dip for a given vertex is determined as an average of the smoothed values of dip at the polygons defined in part by the given vertex; and
 determining further smoothed values of dip, wherein the further smoothed value of dip at a given polygon is determined based on an average of smoothed vertex dip at the vertices that define the given polygon.

7. The system of claim 1, wherein the smoothing module is configured to smooth the values of dip of the individual polygons in iterative smoothing passes through the polygons, wherein each iterative smoothing pass through the polygons incrementally increases the uniformity of dip across the polygon mesh.

8. The system of claim 7, wherein the smoothing module is configured such that a number of iterative smoothing passes made through the polygons is dictated by user input to the system.

9. A computer-implemented method of processing an earth model of a geological volume of interest, the method comprising:
 obtaining the earth model of the geological volume of interest, wherein the earth model includes a polygon mesh that describes a position of a surface within the geological volume of interest, the polygon mesh being comprised of planar polygons defined by three or more vertices, and the earth model including positional coordinates for the vertices of the polygons;

determining values of the dip of the polygon mesh within the earth model, wherein determining values of the dip of the polygon mesh includes determining values of dip for the individual polygons based on the positional coordinates of the vertices defining the polygons;

smoothing the values of dip for the individual polygons without impacting the positional coordinates for the vertices of the polygons.

10. The method of claim 9, further comprising tracing rays through the earth model, wherein the positional coordinates for the vertices of the polygons and the smoothed values of dip for the individual polygons are used during the ray-tracing in determining one or more of (a) a refraction of rays caused by the surface or (b) a reflection of rays caused by the surface.

11. The method of claim 9, further comprising determining values of vertex dip at individual vertices of the polygon mesh, wherein vertex dip for a given vertex is an average value of dip over the polygons defined in part by the given vertex.

12. The method of claim 11, wherein smoothing the values of dip for the individual polygons without impacting the positional coordinates for the vertices of the polygons comprises determining a smoothed value of dip for a location on a given polygon within the polygon mesh as an average of the values of vertex dip for the vertices that define the given polygon.

13. The method of claim 12, wherein the average of the values of vertex dip used to determine the smoothed value of dip for the given polygon is a weighted average, and wherein weights applied to the values of vertex dip used to compute the weighted average are determined based on the location on the given polygon for which the smoothed value of dip is being determined.

14. The method of claim 12, wherein smoothing the values of dip for the individual polygons without impacting the positional coordinates for the vertices of the polygons further comprises:
 determining smoothed values of vertex dip, wherein the smoothed value of vertex dip for a given vertex is determined as an average of the smoothed values of dip at the polygons defined in part by the given vertex; and
 determining further smoothed values of dip, wherein the further smoothed value of dip at a given polygon is determined based on an average of smoothed vertex dip at the vertices that define the given polygon.

15. The method of claim 9, wherein smoothing the values of dip for the individual polygons without impacting the positional coordinates for the vertices of the polygons comprises making iterative smoothing passes through the polygons, wherein each iterative smoothing pass through the polygons incrementally increases the uniformity of dip across the polygon mesh.

* * * * *